United States Patent
Savaresi et al.

(10) Patent No.: US 10,377,308 B2
(45) Date of Patent: Aug. 13, 2019

(54) MOTORCYCLE WITH DEVICE FOR DETECTING A VEHICLE APPROACHING FROM THE REAR

(71) Applicants: DUCATI MOTOR HOLDING S.P.A., Bologna (IT); POLITECNICO DI MILANO, Milan (IT)

(72) Inventors: Sergio Matteo Savaresi, Cremona (IT); Giulio Panzani, Monza (IT); Alessandro Amodio, Milan (IT); Pierluigi Zampieri, Sala Bolognese (IT); Fabio Codeca', Milan (IT)

(73) Assignees: POLITECNICO DI MILANO, Milan (IT); DUCATI MOTOR HOLDING S.P.A., Bologna (IT)

( * ) Notice: Subject to any disclaimer, the term of this patent is extended or adjusted under 35 U.S.C. 154(b) by 0 days.

(21) Appl. No.: 15/975,223

(22) Filed: May 9, 2018

(65) Prior Publication Data
US 2018/0326906 A1 Nov. 15, 2018

(30) Foreign Application Priority Data
May 10, 2017 (IT) .................. 102017000050502

(51) Int. Cl.
*B60Q 9/00* (2006.01)
*B62J 27/00* (2006.01)
(Continued)

(52) U.S. Cl.
CPC .............. *B60Q 9/008* (2013.01); *B62J 27/00* (2013.01); *B62J 99/00* (2013.01); *G01S 13/931* (2013.01);
(Continued)

(58) Field of Classification Search
None
See application file for complete search history.

(56) References Cited

U.S. PATENT DOCUMENTS

| 5,777,290 A * | 7/1998 | Tzanev ................ G01C 9/10 200/61.52 |
| 9,630,672 B2 | 4/2017 | Inoue et al. |

(Continued)

FOREIGN PATENT DOCUMENTS

DE 102013218458 A1 3/2015

OTHER PUBLICATIONS

Search Report and Written Opinion dated Jan. 16, 2018 for Italian patent application No. IT201700050502.

*Primary Examiner* — John F Mortell
(74) *Attorney, Agent, or Firm* — Vorys, Sater, Seymour and Pease LLP

(57) ABSTRACT

A motorcycle includes a frame mounted on wheels having a front and rear parts, handlebar located at the front part motorcycle speed and roll angle detector, the front and rear parts join on a frame longitudinal median plane (W). A device for detecting a vehicle moving towards the rear part when the motorcycle is moving, the device including a radar detector or television camera rigidly of one piece with the motorcycle, the radar detector rigidly associated with the rear part and following its movement. The radar detector connected to a presence and movement evaluator of the vehicle moving towards the rear part capable of determining a variable hazard indication which identifies a time to collision between the vehicle and the motorcycle. The evaluator activating warning means on the basis of such hazard indication which generate a warning for the rider's attention when the hazard indication reaches a predetermined value.

19 Claims, 4 Drawing Sheets

(51) Int. Cl.
*B62J 99/00* (2009.01)
*G01S 13/93* (2006.01)

(52) U.S. Cl.
CPC .... *B62J 2099/002* (2013.01); *B62J 2099/004* (2013.01); *G01S 2013/9325* (2013.01); *G01S 2013/9332* (2013.01); *G01S 2013/9353* (2013.01); *G01S 2013/9378* (2013.01)

(56) References Cited

U.S. PATENT DOCUMENTS

| | | | |
|---|---|---|---|
| 2008/0296880 A1 | 12/2008 | Lin | |
| 2009/0033475 A1 | 2/2009 | Zuziak et al. | |
| 2012/0259526 A1* | 10/2012 | Inoue | B60W 40/112 701/70 |
| 2013/0311075 A1* | 11/2013 | Tran | B60W 30/09 701/117 |
| 2013/0335569 A1* | 12/2013 | Einecke | G01S 13/867 348/148 |
| 2014/0236425 A1* | 8/2014 | Savaresi | B62K 25/04 701/38 |
| 2015/0228066 A1* | 8/2015 | Farb | G06K 9/00805 348/148 |
| 2016/0090037 A1* | 3/2016 | Tetsuka | B60Q 9/008 340/435 |
| 2016/0363665 A1 | 12/2016 | Carlson et al. | |
| 2017/0101147 A1* | 4/2017 | Hasegawa | B60Q 1/44 |
| 2017/0151994 A1* | 6/2017 | Braunberger | B62J 99/00 |

* cited by examiner

MOTORCYCLE WITH DEVICE FOR DETECTING A VEHICLE APPROACHING FROM THE REAR

This claims the benefit of Italian patent application no. 102017000050502, filed May 10, 2017, incorporated by reference.

The present invention relates to a motorcycle according to the precharacterising clause of the principal claim.

As is known, a motorcycle comprises a frame having a median plane joining a front part and a rear part of the vehicle, this frame having a handlebar located at the front part.

Use of a motorcycle, particularly on roads with traffic, requires considerable attention on the part of the rider, in particular when he has to move from his own lane to an adjacent lane to overtake a vehicle in front of the motorcycle. This action means that the rider has to check visually whether other vehicles are approaching the motorcycle from behind before changing lane.

This operation may however be hazardous if, for example on a motorway, a vehicle is approaching from behind at high speed and the rider does not suitably evaluate distances.

Radar systems fitted to motor vehicles which can detect the presence of other vehicles in front of and behind the vehicle, which are also capable of identifying whether there is sufficient space for the vehicle to change lanes on the basis of approaching vehicles, are known.

U.S. Pat. No. 9,630,672 relates to a device for detecting the roll angle of a vehicle, in particular a motorcycle. This device uses a Kalman filter to evaluate various vehicle data such as roll angle, yaw, the speed and the angular speed of the vehicle on the basis of corresponding detected values and on the basis of previously estimated values.

US2009/0033475 describes a warning device for a cyclist capable of warning the latter that an object (such as a vehicle, other bicycles or the like) are approaching from the rear. This text describes the use of an ultrasound transmitter mounted on the bicycle, in particular on the rear part thereof, and the use of a receiver capable of receiving echoes or signals reflected from any objects approaching the bicycle from the rear. A control unit connected to such transmitter and receiver calculates a value for the reflection time for each reflected echo or signal and compares it with corresponding time values so as to determine whether the object is coming closer or not. If it is found that the object is coming closer, the control unit activates an alarm to warn the cyclist.

This prior document is only able to warn the cyclist about whether an object is approaching from the rear, but does not describe nor suggest the determination of any time between possible collision with said object and the bicycle. The prior document only describes the possibility of detecting an object approaching from the rear and consequently of providing an alarm, but does not enable the cyclist to know how much time there is to any possible collision, thus not enabling the cyclist to know for example whether he can divert from the course being followed to avoid the collision.

Substantially the known solution is an YES/NO device which generates a warning if it detects the approach of any object from the rear of the bicycle; the prior document does not however describe or suggest the possibility of offering any kind of indication of the hazard associated with such approach, neither does it describe nor suggest any gradation in the hazard warning, distinguishing for example hazards deriving from vehicles which despite being far from the bicycle are at a speed such as to reach the bicycle in much shorter time than the hazards deriving from vehicles closer to the bicycle but travelling at lower approach speeds such that they will reach the bicycle in longer times.

This is also associated with the manner in which the acoustic signal emitted by the emitter associated with the bicycle is generated: this signal is emitted in a discrete manner, so that dead times (even short ones) are produced when detecting the object approaching from the rear.

US2008/0296880 describes a protection device for a motorcycle through the use of an airbag capable of expanding outwards and covering a surface of the motorcycle so as to protect it after a limiting inclination has been reached or exceeded.

US2016/363665 describes a radar sensor system associated with a bicycle which enables the cyclist to recognise items such as motor vehicles or pedestrians which are close to his bicycle.

US2015228066 describes a warning system for a vehicle comprising a detection system orientated rearwards which is capable of identifying a position and speed relationship for an approaching object. This circuit may be of the type which obtains video images and incorporates a controller operating as a user interface. The controller provides warnings and other information to the user. The controller may be a smartphone application.

DE102013218458 relates to a device for detecting a traffic situation in a blind spot of an inclinable vehicle such as a motorcycle. The device comprises a first and at least a second distance sensor to detect distance information about objects on one side of the vehicle.

The device comprises a detection unit which evaluates whether the signals from the distance sensors are caused by a traffic situation or an inclination status of the device. This device has the advantage that traffic situations in the overturnable vehicle's blind spot can be detected reliably when the overturnable vehicle is at any inclination, because there are always distance sensors which are not capable of detecting the traffic situation but are directed towards the road surface. There are fewer detection and status errors in which an existing traffic situation is not recorded correctly.

The state of the art therefore describes the use of devices associated with motorcycles or two-wheeled vehicles such as bicycles which are capable of detecting whether there is a moving object such as another vehicle or a pedestrian behind the vehicle or within a blind angle at the side of it. These known devices also make it possible to detect objects, for example vehicles, approaching from the rear of the motorcycle or bicycle.

However the state of the art neither describes nor suggests the determination of a collision time between the object or vehicle approaching from the rear and the motorcycle or bicycle; that is the state of the art neither describes nor suggests calculation of the time which the rider of such motorcycle or bicycle has in order to be able to change direction before the approaching vehicle can be alongside (preventing the change in course). Also the known patent documents neither describe nor suggest indicating this time to collision to the rider in a variable way so that at all times when riding the rider can have accurate and up-to-date information about the time for the vehicle approaching from the rear to reach his motorcycle (or bicycle).

The object of the present invention is to provide a motorcycle provided with a device capable of checking whether it is possible for the motorcycle to change course without this giving rise to any danger to the rider.

In particular, the object of the invention is to provide a motorcycle provided with the abovementioned device that is able to warn the rider about the possibility of changing the motorcycle's direction or course (for example in order to overtake) despite the fact that another vehicle is approaching the motorcycle from the rear, even at a speed greater than that of the motorcycle itself.

A further object is to provide a motorcycle provided with a device that can provide the rider, moment by moment, with information which is always up-to-date about the time available before a vehicle approaching the motorcycle from the rear at a greater speed than the latter can reach or come alongside the motorcycle itself.

A further object is to provide a motorcycle of the abovementioned type provided with a device that can provide the rider, moment by moment, with information about the presence of a vehicle approaching a blind spot at the side of the motorcycle.

Another object is to provide a motorcycle provided with the abovementioned device which can warn the rider whenever it is not possible to check for the presence of approaching vehicles, in particular when the motorcycle is inclined in order to take a bend or whenever the motorcycle is inclined to one side.

Another object is to provide a motorcycle with a device through which the approach of a vehicle can be detected continuously, effectively and reliably, even when the presence of the vehicle is momentaneously not detected by the device as a result of effects associated with the functioning of the device itself.

Another object of the invention is to provide a motorcycle with a device of the abovementioned type through which the actual danger due the presence of the approaching vehicle can be evaluated, with differentiated levels.

Another object is to provide a motorcycle with a device of the abovementioned type whose construction does not result in structural changes to the motorcycle and which does not give rise to the occurrence of possible causes of danger during use.

These and other objects which will be obvious to those skilled in the art are accomplished through a motorcycle according to appended claim 1.

For a better understanding of the present invention the following drawings are appended purely by way of a non-limiting example, and in these:

Figure 1:
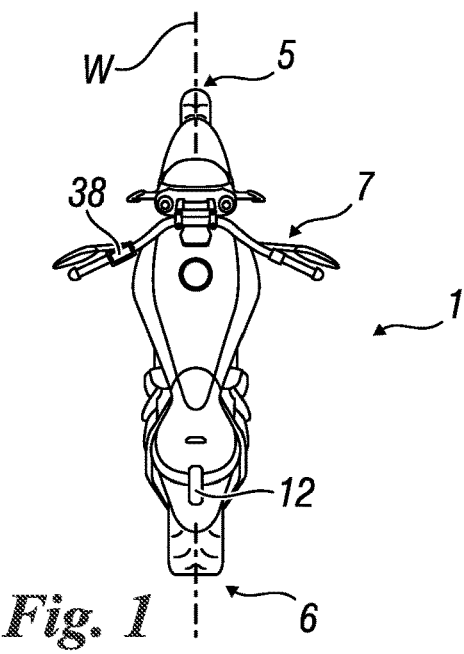
FIG. 1 shows a diagrammatical view of a motorcycle according to the invention.

With reference to the figures mentioned, the invention relates to a motorcycle 1 having a frame (taking this term to mean the whole load-bearing structure itself and the various parts attached to it such as the normal tank, saddle, engine, etc.) mounted on a front and a rear wheel, said frame having a longitudinal median plane W joining a front part 5 and a rear part 6 of the motorcycle. A handlebar 7 is present close to the aforesaid front part 5.

The vehicle is also provided with the usual elements (accelerometers, gyroscopes or other elements, not shown) which can detect the speed of the motorcycle when in movement, its yaw angle and its roll angle on both sides.

These data are used by a normal central processing unit on the motorcycle (not shown) to monitor the functioning of various of its parts, such as for example the engine and the usual shock absorber units.

The motorcycle is provided with a device 10 which can detect the approach of another vehicle (for example a car) from the rear while the motorcycle is being driven, when it is in movement. This device is in particular capable of detecting not only the presence of the approaching vehicle but also its speed so as to offer the rider of the motorcycle an indication of the possibility, risk and danger of any change in course, for example in order to overtake or to turn into a side road from that being travelled.

More particularly, device 10 is connected to a normal data exchange network between the electronic components of the vehicle, for example a motorcycle CAN-BUS, and from this receives data relating to the motorcycle's speed, yaw and roll angle. Such data enable device 10 to calculate in succession, as will be indicated, the absolute speed (that is with respect to a reference system external to the motorcycle, which has a fixed origin and whose X axis is always parallel to the direction along which the motorcycle is moving) of another vehicle V approaching the motorcycle from the rear or moving towards the rear part 6 of the latter.

Through suitable "formatting" via a circuit 11 to create a suitable electrical signal every speed and roll angle value is directed to a detection device 12 such as a radar, television camera or similar (electromagnetic wave) detection device located on the rear part 6 of the motorcycle, preferably on the median plane W, in order to achieve optimum detection of approaching vehicles. The detection unit has a predetermined visual field, for example preferably from 130° to 180°, advantageously of 150° in the horizontal, for example between 7° and 15°, advantageously 10°, in the vertical and with a depth of between for example 50 and 100 m, preferably 80 m.

More particularly the detection unit receives from circuit 11 a yaw datum generated by that circuit on the basis of the roll angle and speed of the vehicle and operates on the basis of these signals.

Detection unit (or merely "sensor") 12 generates an output signal comprising as many subsidiary signals as correspond to vehicles identified to the rear of the motorcycle. For each vehicle or "object" detected sensor 12 provides data corresponding to its relative position with respect to a reference system having its origin in the sensor (that is the distance "d" from that origin) in a two-dimensional Cartesian plane X-Y; this sensor 12 also provides data relating to the speed of each vehicle detected. The measured speed is the absolute speed, that is speed with respect to the fixed reference system with respect to which the motorcycle is also moving.

Sensor 12 also offers data relating to the width and length dimensions of each vehicle detected.

It should be noted that the value of the absolute speed of the vehicle detected is obtained by evaluating the relative speed of that vehicle with respect to the motorcycle and summing this relative speed with the absolute speed of the motorcycle with respect to the fixed reference system (which sensor 12 knows because it is received from the data or CAN-BUS network). Thus, by the term "absolute speed" is in this text meant an absolute speed with respect to the fixed reference system (with respect to which the speed of the motorcycle is also measured), but one calculated with regard to the relative speed of the vehicle and the absolute speed of the motorcycle.

In other words, the "absolute speed" of the vehicle is the "actual" speed of the vehicle with respect to such fixed reference system.

Thanks to this calculation, sensor 12 detects a vehicle V which is actually in movement, distinguishing it from bodies (for example other vehicles) which are stationary with respect to the fixed reference system.

The data generated by sensor 12 are sent to an evaluation unit 15 capable of evaluating whether or not any change in course by the motorcycle is possible (for example for overtaking) and of communicating such possibility to the rider, or of advising him of a danger when performing such a manoeuvre. This communication or warning is provided continuously and is updated on the basis of the data generated by sensor 12, moment by moment.

More particularly, evaluation unit 15 is connected to the data exchange network (for example the CAN BUS) of the vehicle and receives from it data on the speed and roll angle of the motorcycle. Unit 15 comprises a component 16 that is capable of filtering the data received from sensor 12 and said network or CAN BUS and is able to calculate the properties, that is at least the (absolute) speed and (relative) position of the objects (vehicles) detected. Component 16 defines the speed and position of these objects (in particular the distance from the motorcycle to the vehicles) compensating for the presence of noise or any other spurious or corrupt data originating from sensor 12.

This component 16 also operates on the basis of the motorcycle's speed to establish in relative terms (with respect to the motorcycle) the speed and position of approaching vehicle V, that is whether it is moving towards the rear part 6 of the motorcycle (so as also to be able to confirm the speed and position data originating from sensor 12, but which are obviously filtered, and to enable the finding, as will be described below, to check whether there is any danger of collision between the motorcycle and the vehicle even when the motorcycle is moving without changing course).

Figure 4:
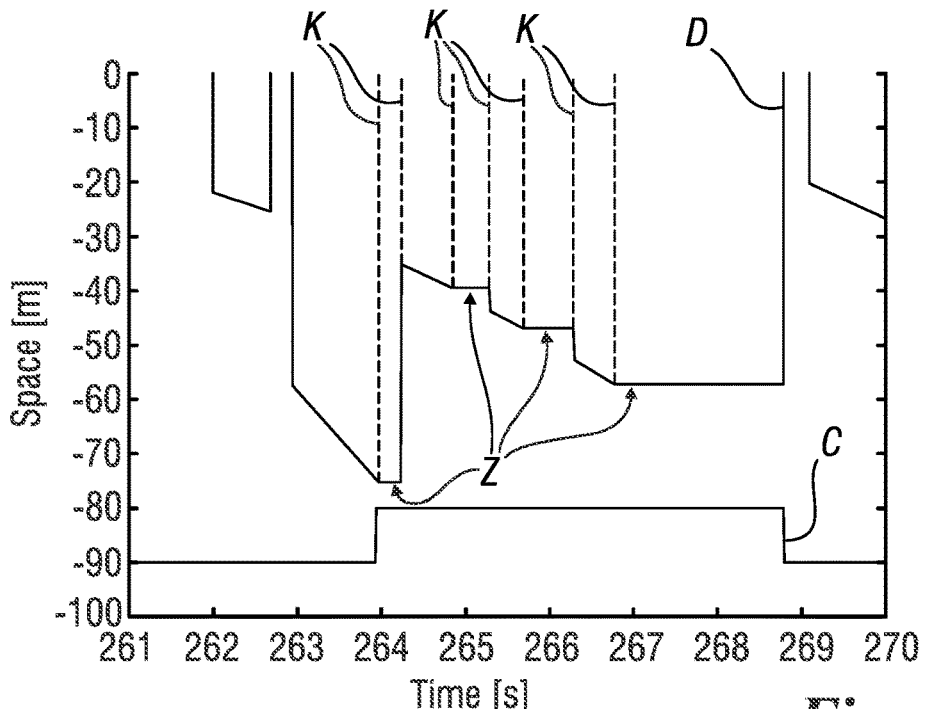
FIG. 4 shows a graphic indicating one way of using the device in FIG. 2.
Figure 6:
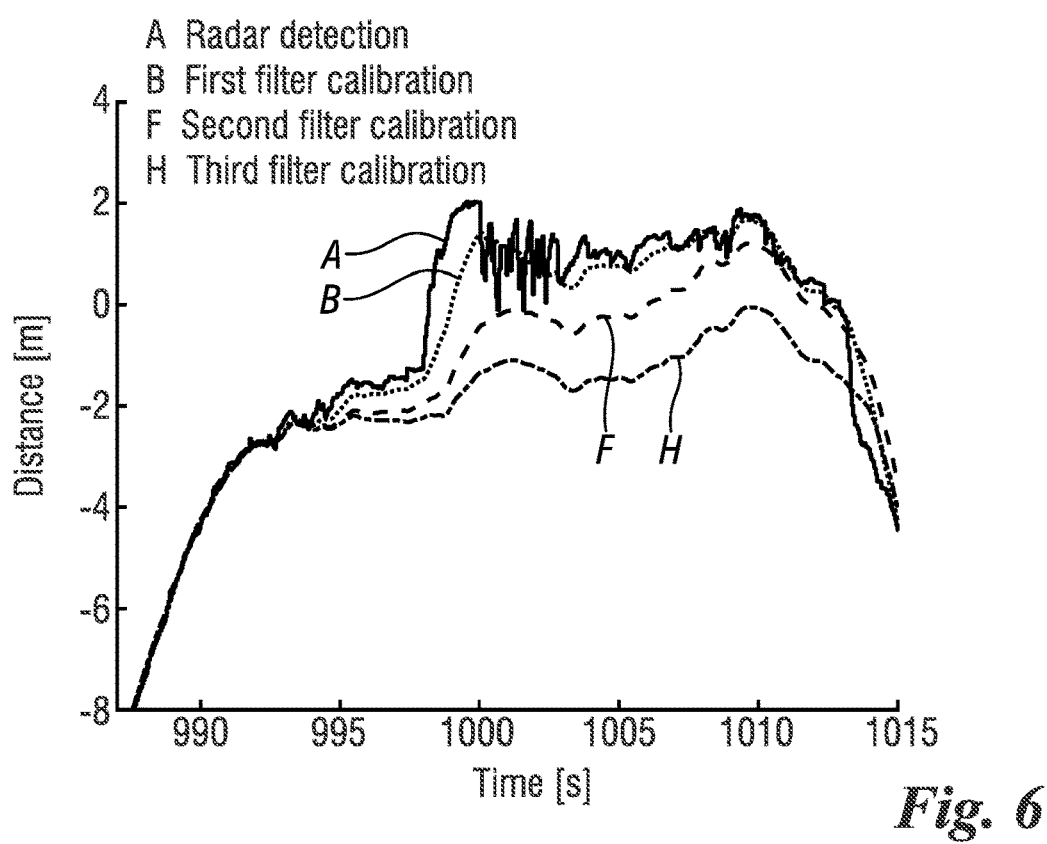
FIG. 6 shows a time/distance graph relating to the detection of vehicles moving at different speeds.

The manner in which such component 16 operates is illustrated graphically in FIGS. 4 and 6. In particular FIG. 4 shows how the data/signals originating from sensor 12 are processed in a time (abscissa) and space (ordinate) diagram: these signals are indicated by the vertical dashed lines K. From these signals component 16 generates corresponding graphs graphics D and C corresponding to the filtered signals and the validated (or determined) detection of the object or vehicle.

This validated signal is based on detection of the vehicle persisting for a sufficiently long time for component 16 to establish its presence. For example, this time may preferably be between 0.5 and 1 second, for component 16 to "accept" the detection as being real.

Arrows Z indicate the sections of graphic D in which the duration of the signal is too short to be considered by component 16 and corresponds to a moment during which detection of the vehicle is interrupted or lost. In this case however the last detection is maintained (straight line parallel to the time axis) until another signal representing detection of the vehicle at a different distance from the motorcycle arrives from sensor 12.

Through the signals corresponding to the different distances detected at different times, graphic D and consequently graphic C corresponding to whether or not a vehicle is approaching the motorcycle are calculated.

However, as mentioned, even when the signal received from sensor 12 is validated (graphic C) it is possible to detect data which might provide a false indication of the position or speed of the vehicle following the motorcycle ("imperfections" in the sensor). This may also be detected through jumps in measuring the detected position which are inconsistent with the speed of the detected following vehicle or a momentaneous loss of signal (for example due to noise or phenomena associated with the operating principle of sensor 12).

In these situations the positions of the objects (vehicles) are filtered by combining the available measurements and using a suitable tool, for example a Kalman filter, which operates on the measured position and speed data for the object following the motorcycle. In this way component 16 (comprising such filter or operating with it) extrapolates the position of the object or vehicle on the basis of the last values measured, overcoming the imperfections in sensor 12.

Figure 5:
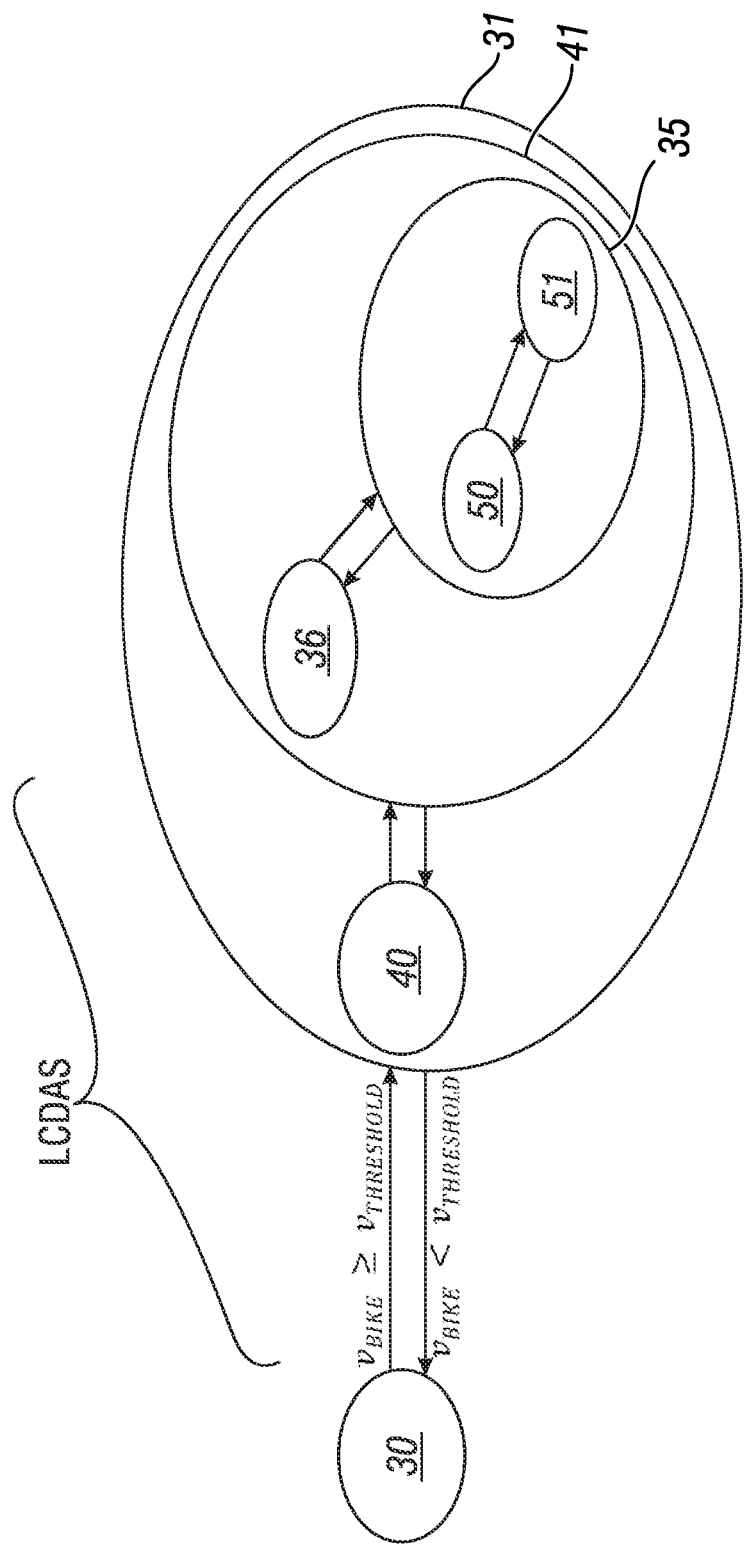
FIG. 5 shows a functional diagram relating to use of the device according to the invention.

FIG. 6 shows examples of graphic A, B, F, H for the signal leaving the Kalman filter indicating the position of the detected object on the basis of the detection by sensor or radar (or television camera) 12. Graphics B, F and H correspond to different filter settings made on the basis of experimental tests. All graphics B, F and H converge with graphic A after a certain period of time. Component 16 thus generates a filtered signal directed to a control unit 25 which, also on the basis of the motorcycle's roll angle, checks for the existence of any hazard conditions using an algorithm that evaluates the possibility of safely changing the course currently being followed. The operating stages of this algorithm are illustrated in FIG. 5.

According to the figure in question the algorithm (hereinafter indicated as LCDAS) has two macro states, that is a disabled state 30 and an enabled status 31.

In particular LCDAS is disabled if the speed of the motorcycle ($V_{bike}$) is below a threshold value ($V_{threshold}$), for example 10 km/h. If the speed of the motorcycle is the same or greater than the threshold, LCDAS is enabled (status 31).

In this condition there is processing of the signals received from component 16 on the basis of a hazard indication. This indication depends on the roll angle of the vehicle indicated by φ: if this indication is greater than a given threshold value (for example 20° or 30°) LCDAS is in a stand-by status (status 40). If instead this value of φ is in absolute terms lower than the threshold value (for example between 0° and 20°) LCDAS becomes fully functional (status 41) to determine whether or not there is a need to warn the rider of a hazard situation (status 35) or not (status 36).

By way of clarification, when the motorcycle is moving perpendicular to the road it has a roll angle of 0°, whereas if the motorcycle is lying completely on the ground the aforesaid angle is 90°.

When evaluating the hazard indication and the need to enter into the fully functional phase following detection of a specific roll angle of the motorcycle, the lateral position of the vehicle with respect to the motorcycle and the relative speed of the motorcycle with respect to the approaching vehicle are taken into consideration by control unit 25 so that it can select only the following vehicles which are potentially able to overtake.

In particular, relative speed is calculated as the difference between the speed of the vehicle $v_V$ (detected by sensor 12 and component 16 as described above) and of the motorcycle $v_M$ (detected directly) that is $\delta v_X = v_V - v_M$ A time to collision (TTC) quantifying the imminence of overtaking by vehicle V (and therefore the danger of the motorcycle changing course) is calculated on the basis of these parameters. This time is calculated as the ratio between the distance from the vehicles to the motorcycle (defined by sensor 12) and the difference between the speeds indicated above, that is $$TTC = d/\delta v_X$$

If this value is below or equal to a reference value, unit activates an element warning the rider of the hazard situation.

The TTC value is a variable hazard indication which is proportional to the distance of vehicle V and inversely proportional to its speed. This indicator is an accurate and refined indication of the danger of a change in course to the motorcycle.

The TTC indicator is also a safe indicator: in fact it considers correctly both the distance between the motorcycle and the approaching vehicle and the difference in speed between the latter and the speed of the motorcycle. In this way, even if there is a difference between $v_V$ and $v_M$, if value "d" is very high then TTC is high; the rider will therefore not receive any warning and may proceed with the change in course. Vice versa, if the difference between $v_V$ and $v_M$ is very small, but the value of "d" is small, TTC will be low and consequently the rider will receive a hazard warning.

This TTC value therefore enables the rider to know whether or not he can safely change course (in order to overtake).

The same thing happens if the vehicle is in the unseen area not covered by the motorcycle's rider's visual field or the vehicle's mirrors, an area known as a "blind spot". This area may however be "covered" by sensor 12, which in this case can generate a warning of presence, independently of its function as a component of the device described above operating to calculate TTC.

In particular, according to the distance from the approaching vehicle, (detected as indicated previously), unit 25 is able to generate a warning signal for the rider when the vehicle is approaching a blind spot and such warning signal considers said proximity or distance. In this way, the rider can receive a signal relative to such a position depending on said distance: the smaller the difference, the higher the danger that the vehicle enters the blind spot coming from the back of the motorcycle and is no longer detectable.

Figure 3:
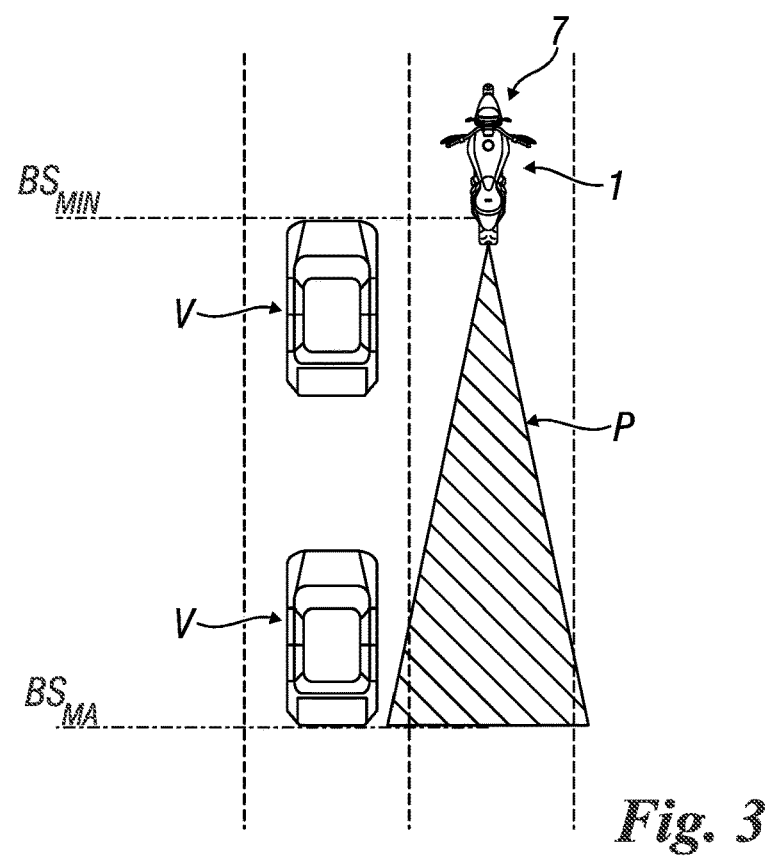
FIG. 3 illustrates a particular situation during use of the motorcycle in FIG. 1.
Figure 2:
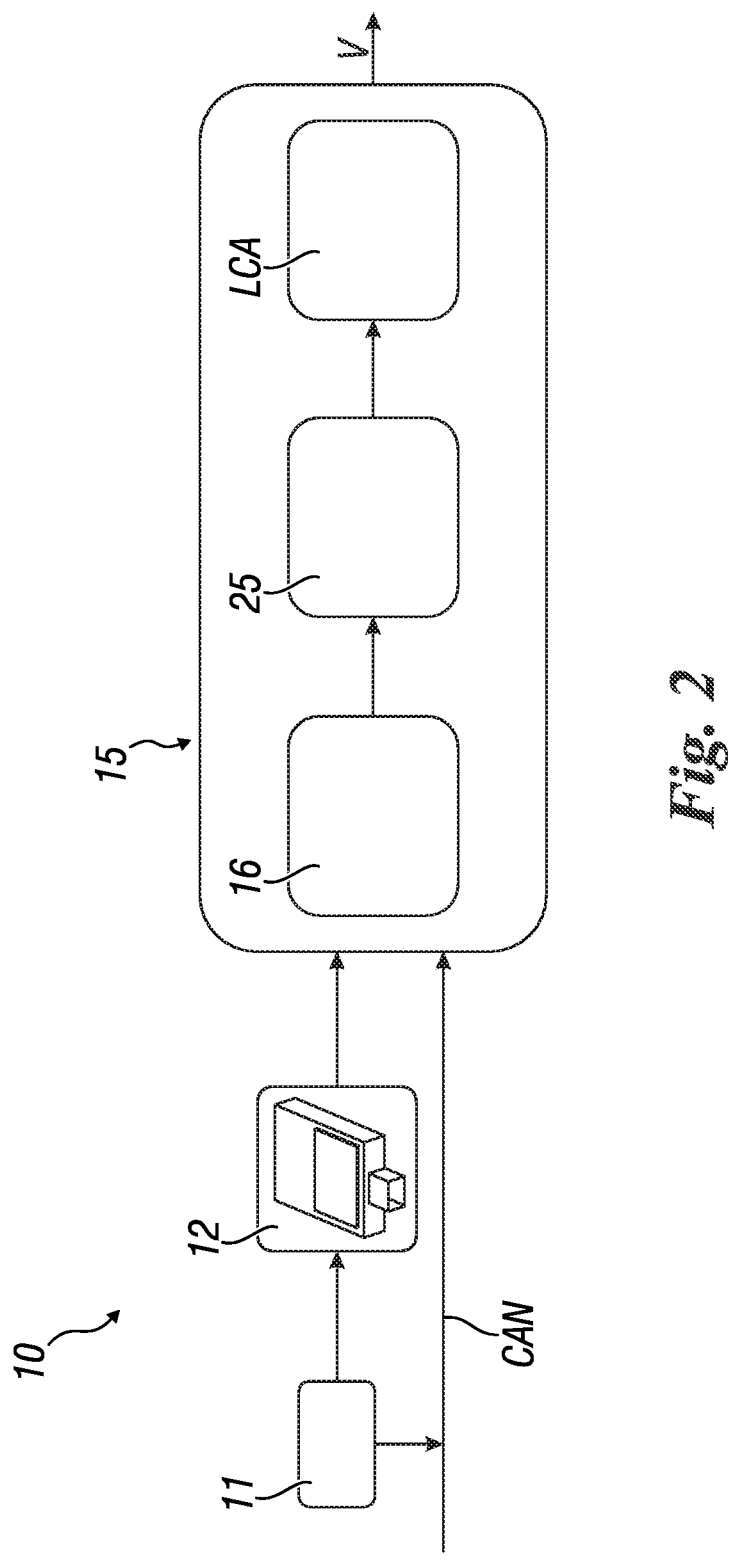
FIG. 2 shows a block diagram of a device applied to the motorcycle according to the invention.

If sensor 12 does not cover the blind spot but nevertheless in view of a previous detection of vehicle V made by sensor 12 unit 25 generates the warning signal on the basis of the motorcycle's roll angle and the data originating from comparator 16 when the previous detected vehicle is in such an area in which sensor 12 now no longer detects it. This situation is shown in FIG. 3 where $BS_{MIN}$ and $BS_{MAX}$ indicate the limits of the blind spot, the vehicles are indicated by V and the detection zone of sensor 12 is indicated by P; when the vehicle is in the $BS_{MIN}$ position, it is highly dangerous and this situation is reached gradually with the decrease of the distance between the motorcycle and the vehicle V.

The warning signal is generated by a warning unit 38 which is for example located on handlebar 7 and is defined for example by one or more LED or is defined by a unit generating vibration positioned on the handlebar or on other parts of the motorcycle, the rider's clothing or helmet to generate vibration which can be perceived by the rider. The luminous signal generated by the LED or the vibration signal varies in relation to the value of the TTC indicator (or to the position of the vehicle that is to its distance from the motorcycle) and enables the rider to know the actual level of danger in the situation at any time when the motorcycle is in use. For example, the stronger the luminous signal (for example the more LED are lit), the more the value of TTC is below the reference value and therefore the greater the potential hazard situation for the rider when the latter wishes to change course, for example in order to overtake.

The condition 41 of LCDAS being activated but in stand-by is achieved or imposed when the motorcycle takes on an excessively high roll angle (that is one greater than the preset threshold value), for example on a bend, when the vehicle is moving. This situation is defined because the "visual field" of sensor 12 degrades rapidly with increasing roll angle, as this sensor is rigidly of one piece with the motorcycle. This is potentially critical both when the motorcycle is being used on the road, for example when taking a bend, and when moving into a lane adjacent to the one from which it starts; but this is also critical in manoeuvres such as entering a camber, where the direction of the bend is opposite to the direction of future movement (and the blind spot is higher).

In a situation such as that indicated above a potentially hazardous scenario for the rider may occur if the aforesaid situation becomes established after a vehicle has been correctly identified as approaching the rear of the motorcycle. In the case in point, if the motorcycle in fact inclines to take a bend the vehicle will unexpectedly disappear from the visual field of sensor 12 even though it is close to the motorcycle (and outside the rider's visual field). As a result of this there will be a situation of extreme danger for the rider in that he will not be warned of the actual (very close) presence of the approaching vehicle.

For this reason the device according to the invention provides for the disabling of sensor 12 with a consequent warning being provided to the rider through warning unit 38 and such sensor 12 is re-enabled when the roll angle again falls below the threshold value (for example 20° or 30°) or another lower value (for example 15°), which indicates that the motorcycle has completed taking the bend.

The aforesaid disabling of the sensor is in any event to be recommended because at high roll angles the visual field of sensor 12 is considerably reduced (as mentioned).

Warning unit 38 can therefore be activated on the basis of two levels of attention/warning 50 and 51: a first level 50, for example associated with the disabling of sensor 12 because the motorcycle is on a bend and the roll angle has become high in a short time, greater than the threshold value (for example greater than 20°), and a second level 51, preferably of variable intensity, because at a roll angle of less than the threshold value (for example between 0° and 20°) there is an immediate danger to the rider because of the approach of a vehicle from the rear at high speed. These different levels may be indicated using different intensities or frequencies of the lighting of the LED or LEDs located on the handlebars defining unit 38, or by lighting up the LEDs for a different time, or a combination of both. Alternatively LEDs of different colours or more LEDs which become activated in a different way in number and/or position (for example on opposite sides of the handlebar) may be used.

The invention makes it possible to provide the rider of the motorcycle with great safety when carrying out changes in course or changing to a lane alongside that being travelled. In addition to this it makes it possible to avoid detection errors when the motorcycle is inclined, but at the same time makes it possible to warn the rider of situations in which there is no detection of vehicles behind the motorcycle and in which the rider must pay the greatest attention to changes in course or bends.

The invention claimed is:

1. A motorcycle comprising
a frame mounted on wheels and having a front part and a rear part,
a handlebar being present at the front part,
detection means on the motorcycle to detect at least the speed and roll angle of the motorcycle when in movement,
the frame having a longitudinal median plane joining the front part and rear part,
a device for detecting a vehicle moving towards the rear part of the motorcycle when such motorcycle is in movement,
said device for detecting comprising a detection device rigidly of one piece with the motorcycle, said detection device comprising a sensor for detecting the speed of the vehicle,
said detection device being connected to means for evaluating the presence and movement of said vehicle which is moving towards the rear part of the motorcycle, approaching said motorcycle, said evaluation means being capable of activating warning means generating a warning for a rider's attention when said vehicle is detected,
the evaluation means comprising a component at least capable of determining the speed of a vehicle following the motorcycle,
wherein the evaluation means operate in relation to the roll angle of the motorcycle, comparing the roll angle of the motorcycle with a threshold value of the angle, the detection means being in particular activated if the roll angle of the motorcycle is less than a predetermined threshold angle value,
wherein if the motorcycle inclines to a roll angle greater than the threshold value, the sensor is disabled with a consequent warning being provided to the rider;
wherein the evaluation means define a variable hazard indication which identifies the time to collision between the approaching vehicle and the motorcycle, said indication being defined on the basis of a comparison between the speed of the motorcycle and the speed of the vehicle moving towards the rear part of the motorcycle and a comparison between the relative distances between said motorcycle and said vehicle,
said warning means being activated whenever the time to collision is less than a predetermined value.

2. The motorcycle according to claim 1, wherein said variable hazard indication identifying a time to collision is determined by the following formula:

$$TTC = d/\delta vx$$

where:
TTC=time to collision;
d=distance of the motorcycle from the vehicle as defined by the detection device of one piece with the motorcycle;
δvx=difference between the speed of the vehicle following the motorcycle and the speed of the motorcycle;
said hazard indication being capable of being compared with a predetermined value.

3. The motorcycle according to claim 1, wherein the evaluation means are capable of activating warning means to generate a warning signal when a vehicle which has been detected to approach the motorcycle approaches a blind spot not covered by the visual field of the motorcycle's rider or the motorcycle's mirrors, said warning signal is based on a danger indicator defined by the evaluation means when the detected approaching vehicle enters the blind spot and deriving from the detection of the variation in the distance between the vehicle that follows the motorcycle and the motorcycle itself.

4. The motorcycle according to claim 1, wherein the warning means have graduated activation according to the value of the variable hazard indication defined by the evaluation means.

5. The motorcycle according to claim 4, wherein said warning means which are gradually activated according to the hazard indication determined are a luminous device comprising at least one LED associated with the handlebar or a vibrator associated with the motorcycle, the rider's clothing or helmet, capable of generating vibration which can be perceived by the rider, the luminous or vibrational signal of such warning means varying according to the value of the hazard indication.

6. The motorcycle according to claim 1, wherein said evaluation means are activated when the speed of the motorcycle is above or at least equal to a threshold value.

7. The motorcycle according to claim 1, wherein the detected speed of the vehicle following the motorcycle is the absolute speed of that vehicle or the relative speed of said vehicle on the basis of which the absolute speed of the vehicle is determined.

8. The motorcycle according to claim 1, wherein said component comprises a filter such as a Kalman filter or the like capable of determining the distance of vehicle from the motorcycle.

9. The motorcycle according to claim 1, wherein said component is connected to a control unit of the evaluation means which determines whether or not there is a hazard situation for the rider on the basis of the roll angle of the motorcycle and if so activates the warning means.

10. The motorcycle according to claim 5, wherein the evaluation means, which also operate on the basis of the roll angle of the motorcycle, disable the detection device if said roll angle has a value greater than the predetermined threshold value so as to interrupt detection of the vehicle approaching the rear part of the motorcycle, the warning means being active in this condition.

11. The motorcycle according to claim 1, wherein said warning means operate in a different manner if a possible hazard associated with the hazard indication which identifies the time to collision is determined or if the roll angle greater than the set threshold value is detected.

12. The motorcycle according to claim 1, wherein the detected speed of the approaching vehicle is considered to be constant when evaluating the hazard indication defining time to collision when said vehicle can no longer be detected by the detection device for a limited period of time, preferably less than 1 second.

13. The motorcycle according to claim 1, wherein said detection device is a radar or television camera and is connected to a data exchange network of the motorcycle and receives data relating to the speed of said motorcycle and data relating to the motorcycle's roll angle.

14. The motorcycle according to claim 12, wherein there is a device defining a value of the yaw angle of the motorcycle on the basis of the roll angle that is located between the detection device and the motorcycle's data exchange network, and that it passes this value to said detection device.

15. The motorcycle according to claim 2, wherein said warning means operate in a different manner if a possible hazard associated with the hazard indication which identifies the time to collision is determined or if the roll angle greater than the set threshold value is detected.

16. The motorcycle according to claim 5, wherein said warning means operate in a different manner if a possible hazard associated with the hazard indication which identifies the time to collision is determined or if the roll angle greater than the set threshold value is detected.

17. The motorcycle according to claim 9, wherein said warning means operate in a different manner if a possible hazard associated with the hazard indication which identifies the time to collision is determined or if the roll angle greater than the set threshold value is detected.

18. A motorcycle comprising
a frame mounted on wheels and having a front part and a rear part,
a handlebar being present at the front part,
detection means on the motorcycle to detect at least the speed and roll angle of the motorcycle when in movement,
the frame having a longitudinal median plane joining the front part and rear part,
a device for detecting a vehicle moving towards the rear part of the motorcycle when such motorcycle is in movement,
said device for detecting comprising a detection device rigidly of one piece with the motorcycle, said detection device comprising a sensor for detecting the speed of the vehicle,
said detection device being connected to means for evaluating the presence and movement of said vehicle which is moving towards the rear part of the motorcycle, approaching said motorcycle, said evaluation means being capable of activating warning means generating a warning for a rider's attention when said vehicle is detected,
the evaluation means comprising a component at least capable of determining the speed of a vehicle following the motorcycle,
wherein the evaluation means define a variable hazard indication which identifies the time to collision between the approaching vehicle and the motorcycle, said indication being defined on the basis of a comparison between the speed of the motorcycle and the speed of the vehicle moving towards the rear part of the motorcycle and a comparison between the relative distances between said motorcycle and said vehicle,
said warning means being activated whenever the time to collision is less than a predetermined value,
wherein if the motorcycle inclines to a roll angle greater than a set threshold value, the sensor is disabled with a consequent warning being provided to the rider,
wherein said warning means operates in a different manner if a possible hazard associated with the hazard indication which identifies the time to collision is determined or if the roll angle greater than the set threshold value is detected.

19. The motorcycle according to claim 18, wherein said variable hazard indication identifying a time to collision is determined by the following formula:

$$TTC = d/\delta v_x$$

where:
TTC=time to collision;
d=distance of the motorcycle from the vehicle as defined by the detection device of one piece with the motorcycle;
$\delta v_x$=difference between the speed of the vehicle following the motorcycle and the speed of the motorcycle;
said hazard indication being capable of being compared with a predetermined value.

* * * * *